United States Patent Office 2,798,061
Patented July 2, 1957

2,798,061

GRAFT COPOLYMERS CONTAINING N-ACRYLYL AND N-METHACRYLYL SUBSTITUTED NITROGEN HETEROCYCLIC COMPONENTS

Harry W. Coover, Jr., and Newton H. Shearer, Jr., Kingsport, Tenn., assignors to Eastman Kodak Company, Rochester, N. Y., a corporation of New Jersey No Drawing. Application September 28, 1955,
Serial No. 537,271

10 Claims. (Cl. 260—45.5)

This invention relates to graft copolymers containing N-acrylyl and N-methacrylyl substituted nitrogen heterocyclic compounds.

It is known that N-acrylyl and N-methacrylyl substituted heterocyclic compounds can be homopolymerized to resinous polymers. For example, G. E. Ham, U. S. Patent 2,658,056, dated November 3, 1953, and U. S. Patent 2,683,703, dated July 13, 1954, show the preparation of polymeric N-methacrylyl morpholine and polymeric N-acrylyl morpholine, respectively. However, it was noted by the patentee that while the respective monomers polymerized readily to homopolymers, they did not form copolymers with styrene or butadiene. These homopolymers were water-soluble and of utility only as sizing compounds.

We have now found that not only N-acrylyl and methacrylyl morpholine, but other related nitrogen heterocyclic compounds such as acrylyl and methacrylyl thiomorpholines and acrylyl and methacrylyl piperidines can also be homopolymerized, and that contrary to the teachings of the above mentioned patents, all of the above said heterocyclic compounds can be copolymerized, in certain proportions, with one or more other monoethylenically unsaturated, polymerizable monomers to give resinous polymers, which can then be graft polymerized with certain monomers such as acrylonitrile, methacrylonitrile, vinyl chloride or vinylidene chloride, alone or in combination, to give the corresponding resinous graft copolymers. The latter products are particularly useful for fiber-making purposes. For example, fibers produced by graft polymerizing a mixture of acrylonitrile and any of the above mentioned preformed nitrogen heterocyclic group containing polymers, in certain proportions, give fibers which have good tensile strength, good alkali resistance, good dyeability and high softening points in the range of from 170° to 230° C.

It is, accordingly, an object of the invention to provide simple copolymers containing therein certain proportions of N-acrylyl or N-methacrylyl substituted morpholines, thiomorpholines or piperidines. Another object is to provide graft copolymers of the above mentioned copolymers with acrylonitrile, methacrylonitrile, vinyl chloride or vinylidene chloride. Another object is to provide spinnable solutions of the said graft copolymers and fibers thereof. Other objects will become apparent hereinafter.

In accordance with the invention, we prepare the new class of graft copolymers by first preparing a homopolymer or a copolymer of a heterocyclic monomer having the general formula:

I
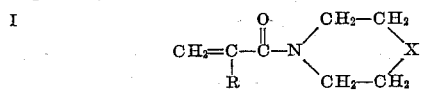

wherein X represents an atom of oxygen, an atom of sulphur or the group —CH₂—, the said copolymer containing at least 50% by weight of the said heterocyclic monomer, but preferably 50-75%, and the remainder comprising a different monoethylenically unsaturated, polymerizable compound containing a single CH₂=C< group, but more particularly monomers such as acrylonitrile, methacrylonitrile, an acrylic acid amide such as acrylamide and methacrylamide and N-alkyl and N-dialkyl derivatives thereof wherein the alkyl group contains from 1 to 4 carbon atoms, a vinyl or isopropenyl carboxylic ester wherein the acid radical contains from 2 to 4 carbon atoms such as vinyl acetate, isopropenyl acetate, etc., a vinylidene halide such as vinyl chloride, vinyl fluoride, vinylidene-chloride, etc. an alkyl acrylate or methacrylate wherein the alkyl group contains from 1 to 4 carbon atoms e. g. methyl acrylate, ethyl acrylate, propyl acrylate, butyl acrylate and corresponding methacrylates or a styrene compound such as styrene, α-methylstyrene, o-, p- or m-methylstyrene, and then graft polymerizing onto the above preformed polymer, which may or may not be separated from its polymerization reaction mixture, a nitrile monomer having the general formula:

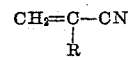

wherein R is a hydrogen atom or a methyl group i. e. acrylonitrile or methacrylonitrile, or a mixture of monomers containing at least 30%, but preferably from 30–60% by weight of the said nitrile monomer and the remainder either vinyl chloride or vinylidene chloride. The proportions employed in the graft copolymerization step may vary from 15 to 30% by weight of the preformed heterocyclic polymer to from 85 to 70% by weight of the nitrile monomer or the nitrile monomer mixture. The graft copolymers produced contain the above components in approximately the above stated proportions. Those of our graft copolymers prepared from poly N-acrylyl morpholine or copolymers thereof with monomeric acrylonitrile are outstanding and are preferred.

The polymerizations for preparing the simple copolymers may be carried out in mass, in solution or in suspension in a nonsolvent for the monomers such as water. The graft polymerizations may also be carried out as above, but preferably in a water medium although other reaction media such as organic solvents can also be employed, for example, a polymerization medium consisting of aqueous acetone or other aqueous solvent can be used. The above polymerizations are accelerated by heat, by actinic light and by polymerization catalysts. Advantageously, peroxide catalysts which are soluble in the monomers or in the reaction mediums are employed, e. g. organic and inorganic peroxides such as benzoyl peroxide, acetyl peroxide, lauryl peroxide, hydrogen peroxide, persulfates e. g. alkali metal persulfates such as sodium and potassium persulfates, ammonium persulfates, etc., perborates e. g. alkali metal perborates such as sodium and potassium perborates, ammonium perborate, etc. Azo-bisnitriles are also effective polymerization catalysts. Mixtures of catalysts can also be employed. The amount of such catalyst can be varied over a wide range, but advantageously from about 0.01 to 2.0%, or even more, based on the total weight of the components to be polymerized. Normal pressures are generally employed; however, good results are also obtainable at pressures below and above normal atmospheric pressures. The temperature at which the polymerizations are carried out may vary from 15° to 100° C., but preferably from 25° to 75° C. Advantageously, the polymerizations for preparing the simple copolymers are carried to completion. They may be used either in isolated or unisolated form. In the graft copolymerization step the added monomeric material may be polymerized 70–100%, the lower conversion being in some cases advantageous, especially where a continuous process is employed. Batch or continuous processes can be employed. Where a continuous process is desirable, as for example in the graft copolymerization, the particular preformed nitrogen heterocyclic polymer and the nitrile monomer or mixture thereof and other necessary substituents can be added, in any form but preferably in solution or as suspensions, to the reaction system in continuous manner and the graft copolymer withdrawn from the system as formed.

Where the polymerizations are carried out in an aqueous medium, if desired, emulsifying agents can also be added to the polymerization reaction mixtures, in order to distribute the reactants uniformly throughout the reaction medium. Typical emulsifying agents include the alkali metal salts of certain alkyl acid sulfates, e. g. sodium and potassium lauryl sulfates, etc., alkali metal salts of aromatic sulfonic acids, e. g. sodium isobutyl naphthalenesulfonate, etc., alkali metal or amine addition salts of sulfosuccinic acid esters, alkali metal salts of fatty acids containing from 12 to 20 carbon atoms, sulfonated fatty acid amides, alkali metal salts of alkane sulfonic acids, sulfonated ethers such as the sodium salt of an arylpolyether sulfonate (e. g. the sodium salt of phenoxy polyalkylene ether sulfonate), etc. Mixtures of emulsifying agents can be employed. Advantageously, reducing agents such as alkali metal sulfites and bisulfites, e. g. sodium, potassium, etc. sulfites and metabisulfites can also be added to the polymerization reaction mixtures in about the same amounts as the polymerization catalyst to reduce the time required to effect polymerization. If desired, chain regulators can also be employed such as hexyl, cetyl, dodecyl, myristyl, etc. mercaptans.

The following examples will serve further to illustrate the manner whereby we practice our invention.

Example 1

10 g. of N-acrylylmorpholine, 100 cc. of water and 0.1 g. of potassium persulfate were placed in a pressure bottle. The air in the bottle was displaced by nitrogen gas, the bottle was closed and the reaction mixture was heated at 50° C. for 24 hours. The homopolymer, poly N-acrylylmorpholine, was water-soluble and was isolated by evaporation of the aqueous solution.

In place of the N-acrylylmorpholine, there was substituted in the above example a like amount of N-methacrylylmorpholine, N-acrylylthiomorpholine, N-methacrylylthiomorpholine, N-acrylylpiperidine or N-methacrylylpiperidine to give the corresponding resinous homopolymers.

Example 2

The procedure of Example 1 was followed using 5 g. of N-acrylylmorpholine and 5 g. of acrylonitrile with 0.1 g. of potassium persulfate. The copolymer which formed contained 50% by weight of N-acrylylmorpholine and 50% by weight of acrylonitrile. It was insoluble in water and was isolated by filtration. The inherent viscosity of this copolymer was 1.3. Its primary usefulness was for preparing graft copolymers. However, from a solution of 50 parts of the copolymer and 50 parts of polyacrylonitrile in dimethylformamide, strong and readily dyeable fibers can also be spun.

In place of the acrylonitrile, there was substituted a like amount of methyl methacrylate, isopropenyl acetate, styrene, vinyl chloride or vinylidene chloride to give the corresponding resinous copolymers of like utility. Also, there may be substituted in the above example a like amount of any other of the mentioned nitrogen heterocyclic monomers coming within the invention, for example, N-methacrylylmorpholine, N-acrylylthiomorpholine, N-methacrylylthiomorpholine, N-acrylylpiperidine or N-methacrylylpiperidine to give corresponding resinous copolymers, having similar utility.

Example 3

A bulk copolymer was prepared by heating a mixture of 1 g. of N-acrylylmorpholine and 1 g. of styrene with 0.08 g. of acetyl peroxide for 16 hrs. at 60° C. The conversion to polymer was 70%. The polymer was isolated by dissolving the product in dimethylformamide and reprecipitating it with methanol. The isolated polymer was a waxy solid having an intrinsic viscosity of 0.83 and a softening point of 156° C. Analysis showed 4.29% nitrogen present indicating about 43% by weight of N-acrylylmorpholine present in the copolymer. Its primary usefulness was for preparing graft copolymers; however, it was also useful as a molding material.

Example 4

A bulk copolymer was prepared by heating a mixture of 1 g. of N-acrylylpiperidine and 1 g. of styrene containing 0.08 g. of acetyl peroxide for 16 hrs. at 60° C. A 75% conversion to copolymer having an intrinsic viscosity of 0.50 was obtained. The polymer was isolated by dissolving the product in dimethylformamide and reprecipitating it by addition of methanol. The isolated polymer had a softening point of 145 to 150° C. Analysis showed 4.21% nitrogen indicating about 42% by weight of N-acrylylpiperidine present in the copolymer. Its primary usefulness was for preparing graft copolymers; however, it was also useful as a molding material.

By following the procedure of Examples 3 and 4, copolymers of styrene with N-methacrylylmorpholine, N-methacrylylpiperidine, N-acrylylthiomorpholine and N-methacrylylthiomorpholine may likewise be prepared.

Example 5

5 g. of N-acrylylpiperidine and 5 g. of acrylonitrile were placed in a pressure bottle containing 100 cc. of water. 0.1 g. of potassium persulfate was added. The air in the bottle was displaced by nitrogen. The bottle was closed and the reaction mixture was heated at 50° C. for 24 hrs. The polymer which formed was insoluble in water and could be isolated by filtration. Its primary usefulness was for preparing graft copolymers, however, from a solution of 50 parts of the copolymer and 50 parts of polyacrylonitrile in dimethylformamide, strong and readily dyeable fibers can also be prepared.

In place of the acrylonitrile in the above example, there may be substituted a like amount of methyl methacrylate or isopropenyl acetate to give corresponding resinous copolymers. Also, the N-acrylylpiperidine may be substituted by N-methacrylylpiperidine.

Example 6

5. g. of N-acrylylpiperidine, 2 g. of soap, 0.1 g. of ammonium persulfate, and 0.2 g. of ammonium bisulfite were dispersed in 100 cc. of water in a pressure vessel. The vessel was closed and vinyl chloride was passed in until a total of 10 g. had been added. After heating the bottle for 24 hours at 60°, acetic acid was added. The white product which separated was filtered off, washed free of acid with distilled water, and then dried. The copolymer so obtained was found to be useful not only for preparing graft copolymers of the invention, but also useful in the manufacture of molded objects. When a molecular equivalent of vinylidene chloride replaces the vinyl chloride in the above example, a similarly useful copolymer is obtained.

Example 7

7 g. of N-acrylylmorpholine and 3 g. of acrylonitrile were dissolved in 100 cc. of water containing 0.1 g. of potassium persulfate and the mixture placed in a pressure bottle. The air in the bottle was displaced by nitrogen gas, the bottle closed and the mixture was heated at 50° C. for 24 hours. The copolymer which formed in solution was then subjected to graft polymerization at 35° C. after addition of 25 g. of acrylonitrile, 250 cc. of water, 0.025 g. of potassium persulfate and 0.025 g. of potassium metabisulfite. The resulting insoluble graft copolymer was isolated by filtration. It contained the components in approximately the stated ratios. Fibers were spun from a dimethylformamide solution of this graft copolymer. They showed a tensile strength of 3 g. per denier, a moisture regain of 3.3%, good alkali resistance, good dyeability and a high softening point in the range of 205°–230° C.

In place of the N-acrylylmorpholine in the above example, there may be substituted a like amount of N-methacrylylmorpholine to give the corresponding graft copolymer which also gives fibers of good quality.

Example 8

The procedure of Example 7 was followed except that 10 g. of N-acrylylmorpholine was homopolymerized, and this was then graft polymerized with 25 g. of monomeric acrylonitrile to give a graft copolymer containing approximately 71% by weight of acrylonitrile and 29% by weight of N-acrylylmorpholine. Fibers spun from this graft copolymer showed good physical propertties.

Example 9

2.0 g. of poly N-acrylylmorpholine was dissolved in 100 cc. of water containing 0.1 g. of potassium persulfate, 0.1 g. of metabisulfite, 4.0 g. of vinylidene chloride, and 4.0 g. of acrylonitrile. The resulting solution was then heated for 16 hrs. at 35° C., at the end of which time it was heated to 75° C. The precipitated graft copolymer was isolated by filtration, washed, and dried. It contained approximately 20% by weight of poly N-acrylylmorpholine, the remainder being equal amounts of vinylidene chloride and acrylonitrile. Fibers obtained therefrom had a bar sticking temperature of 170 to 180° C., showed an excellent affinity for dyes, and were noninflammable.

Example 10

2.6 g. of poly N-acrylylmorpholine were dissolved in 100 cc. of water containing 0.1 g. of potassium persulfate, 0.1 g. of sodium bisulfite, 5.5 g. of vinyl chloride, and 2.5 g. of acrylonitrile. The resulting solution was heated for 16 hrs. at 35°. The precipitated graft copolymer was isolated by filtration, washed, and dried. It contained approximately 25% by weight of poly N-acrylylmorpholine, the remainder being vinyl chloride and acrylonitrile in about the stated ratio. Fibers obtained from this polymer showed an excellent affinity for acid wool and direct dyes, and were noninflammable.

Example 11

2.0 g. of N-acrylylmorpholine and 0.5 g. of acrylamide were added to 100 cc. of water containing 0.05 g. of potassium persulfate plus 1 g. of ortho-phosphoric acid. Polymerization was completed by heating at 50° C. for 12 hrs. 3.0 g. of vinyl chloride, 4.5 g. of methacrylonitrile, 0.1 g. of potassium persulfate, and 0.1 g. sodium bisulfate were added to the cooled reaction mixture and the polymerization was completed by heating at 35° C. for an additional 14 hrs. The precipitated graft copolymer was purified in the usual manner. It contained the components in approximately the stated ratios. The fibers obtained therefrom showed high affinity for dyes.

In place of the N-acrylylmorpholine in the above example, there may be substituted a like amount of N-methacrylylmorpholine, or of N-acrylylthiomorpholine, or of N-methacrylylthiomorpholine, or N-acrylylpiperidine to give the corresponding graft copolymers which also have good fiber utility.

Example 12

7 g. of N-acrylylpiperidine and 3 g. of acrylonitrile were placed in a pressure bottle containing 100 cc. of water and 0.1 g. of potassium persulfate added. The air in the bottle was displaced by nitrogen, the bottle then was closed, and the reaction mixture was heated at 50° C. for 24 hours. The copolymer which formed was then subjected to graft polymerization at 35° C. after the addition of 25 g. of acrylonitrile, 250 cc. of water, 0.025 g. of potassium persulfate and 0.025 g. of potassium metabisulfite. The resulting insoluble graft copolymer was isolated by filtration. It contained the components in about the stated ratios. Fibers were spun from the dimethylformamide solution of this graft copolymer. They were readily dyeable and had a softening point in the range of 205°–230° C.

Example 13

2.5 g. of poly N-acrylylpiperidine were dissolved in 100 g. of water containing 0.1 g. of potassium persulfate, 0.1 g. of potassium meta-bisulfite, and 8.0 g. of acrylonitrile. The resulting solution was heated for 16 hrs. at 30° C., at the end of which time is was heated to 75° C. The precipitated graft copolymer was isolated by filtration, washed, and dried. It contained the components in approximately the stated ratio. Fibers obtained therefrom had a bar sticking temperature of 200 to 210° C. and were noninflammable.

In place of poly N-acrylylpiperidine in the above example, there may be substituted a like amount of poly N-methacrylylpiperidine to give the corresponding graft copolymer having generally similar properties.

Example 14

2.0 g. of N-acrylylpiperidine and 0.5 g. of acrylamide were dissolved in 75 cc. of water containing 0.05 g. of ammonium persulfate and 0.05 g. of potassium bisulfite. Polymerization was completed by heating at 75° C. for 12 hrs. 4.0 g. of vinylidene chloride, 4.0 g. of acrylonitrile, 0.1 g. of ammonium persulfate, and 0.1 g. of sodium bisulfite were then added and the polymerization was completed by heating at 35° C. for an additional 12 hrs. The precipitated graft copolymer was soluble in dimethyl formamide. It contained the components in about the stated ratios. Fibers obtained therefrom melted at 160° to 170° C., had an excellent affinity for dyes, and were noninflammable.

In place of the N-acrylylpiperidene in the above example, there may be substituted a like amount of N-methacrylylpiperidine to give the corresponding graft copolymer which likewise gives fibers of good quality.

Example 15

2.5 g. of poly N-acrylylthiomorpholine were dissolved in 100 cc. of water containing 0.1 g. of potassium persulfate, 0.1 g. of potassium metabisulfite and 8.0 of acrylonitrile. The resulting solution was heated 16 hours at 30° C., at the end of which time it was heated to 75° C. The precipitated graft copolymer was isolated by filtration, washed with water and dried. It contained the components in approximately the above stated ratio. Fibers obtained therefrom had a bar sticking temperature of about 200–210° C.

Example 16

2.0 g. of N-acrylylthiomorpholine and 0.5 g. of acrylamide were dissolved in 75 cc. of water containing 0.05 g. of ammonium persulfate and 0.05 g. of potassium bisulfite. Polymerization was completed by heating at 75° C. for 12 hours. Then 4.0 g. of vinylidene chloride and 4.0 g. of acrylonitrile, 0.1 g. of ammonium persulfate and 0.1 g. of sodium bisulfite were added to the reaction mixture and the polymerization was completed by heating at 35° C. for an additional 12 hours. The precipitated graft copolymer obtained was isolated by filtration and was soluble in dimethylformamide. It contained the components in about the above stated ratio. Fibers obtained therefrom melted at about 160–170° C., had an excellent affinity for dyes, and were noninflammable.

By proceeding as set forth in the preceding examples other resinous graft copolymers of the invention may be prepared from any of the described preformed modifying homopolymers and copolymers of N-acrylyl and N-methacrylyl derivatives of morpholine, thiomorpholine and piperidine together with the mentioned monomers acrylonitrile, methacrylonitrile, vinyl chloride and vinylidene chloride, which latter are grafted onto the said preformed modifying polymers to give the said resinous graft copolymers that are especially valuable fiber-forming materials. The graft copolymers of the invention are soluble in organic solvents such as dimethyl-formamide, dimethylacetamide, γ-butyrolactone, ethylene carbonate, N-methyl-2-pyrrolidone, malononitrile, ethylene cyanohydrin, dimethyl cyanamide, etc., and are compatible with polyacrylonitrile to form mixed compositions. The solutions or dopes of the graft copolymers or mixtures thereof with polyacrylonitrile can be spun into filaments and fibers by wet or dry spinning techniques and such solutions may have incorporated therein, if desired, various other materials such as fillers, dyes, pigments, and the like.

What we claim is:

1. A resinous graft copolymer of a mixture of (1) 15–30% by weight of a preformed polymer of (a) 50–100% by weight of monomeric material of the formula:

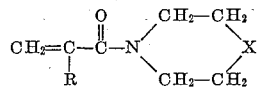

wherein R represents a member selected from the group consisting of an atom of hydrogen and a methyl group and X represents a member selected from the group consisting of an atom of oxygen, an atom of sulphur and a —CH$_2$— group, and (b) from 50–0% by weight of a different monoethylenically unsaturated polymerizable monomer containing a single

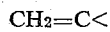

group, and (2) 85–70% by weight of polymerizable monomeric material consisting of (a) 30–100% by weight of a member selected from the group consisting of acrylonitrile and methacrylonitrile and (b) 70–0% by weight of a member selected from the group consisting of vinyl chloride and vinylidene chloride.

2. A resinous graft copolymer of a mixture of (1) 15–30% by weight of a preformed polymer of (a) 50–100% by weight of N-acrylylmorpholine and (b) 50–0% by weight of acrylonitrile, and (2) 85–15% by weight of polymerizable monomeric material consisting of (a) 30–100% by weight of acrylonitrile and (b) 70–0% by weight of vinylidene chloride.

3. A resinous graft copolymer of a mixture of (1) 15–30% by weight of a preformed polymer of (a) 50–100% by weight of N-acrylypiperidine and (b) 50–0% by weight of acrylamide, and (2) 85–15% by weight of polymerizable monomeric material consisting of (a) 30–100% by weight of acrylonitrile and (b) 70–0% by weight of vinyl chloride.

4. A resinous graft copolymer of a mixture of (1) 15–30% by weight of a preformed polymer of (a) 50–100% by weight of N-acrylylthiomorpholine and (b) 50–0% by weight of acrylamide, and (2) 85–15% by weight of polymerizable material consisting of (a) 30–100% by weight of acrylonitrile and (b) 70–0% by weight vinylidene chloride.

5. A resinous graft copolymer of 15–30% by weight of preformed poly N-acrylylmorpholine and 85–70% by weight of monomeric acrylonitrile.

6. A resinous graft copolymer of a mixture of (1) 15–30% by weight of a preformed polymer of (a) 50–75% by weight of N-acrylylmorpholine and (b) 50–25% by weight of acrylonitrile, and (2) 85–70% by weight of monomeric acrylonitrile.

7. A resinous graft copolymer of a mixture of (1) 15–30% by weight of a preformed polymer of (a) 50–75% by weight of N-acrylylmorpholine and (b) 50–25% by weight of acrylonitrile, and (2) 85–70% by weight of monomeric material consisting of (a) 30–60% by weight of acrylonitrile and (b) 70–40% by weight of vinyl chloride.

8. A resinous graft copolymer of 15–30% by weight of preformed poly N-acrylylpiperidine and 85–70% by weight of monomeric acrylonitrile.

9. A resinous graft copolymer of 15–30% by weight of preformed poly N-acrylythiomorpholine and 85–70% by weight of monomeric acrylonitrile.

10. A process for preparing a resinous graft copolymer which comprises heating in the presence of a peroxide polymerization catalyst a mixture of (1) 15–30% by weight of a preformed polymer of (a) 50–100% by weight of monomeric material of the formula:

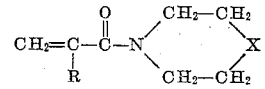

wherein R represents a member selected from the group consisting of an atom of hydrogen and a methyl group and X represents a member selected from the group consisting of an atom of oxygen, an atom of sulphur and a —CH$_2$— group, and (b) from 50–0% by weight of a different monoethylenically unsaturated polymerizable monomer containing a single

group, and (2) 85–70% by weight of polymerizable monomeric material consisting of (a) 30–100% by weight of a member selected from the group consisting of acrylonitrile and methacrylonitrile and (b) 70–0% by weight of a member selected from the group consisting of vinyl chloride and vinylidene chloride until the monomeric material has polymerized to form the said resinous graft copolymer.

References Cited in the file of this patent
UNITED STATES PATENTS

| | | |
|---|---|---|
| 2,620,324 | Coover et al. | Dec. 2, 1952 |
| 2,649,434 | Coover et al. | Aug. 18, 1953 |
| 2,658,056 | Ham | Nov. 3, 1953 |
| 2,683,703 | Ham | July 13, 1954 |